US006717575B2

(12) United States Patent
Hino et al.

(10) Patent No.: US 6,717,575 B2
(45) Date of Patent: Apr. 6, 2004

(54) IMAGE DRAWING METHOD, IMAGE DRAWING APPARATUS, RECORDING MEDIUM, AND PROGRAM

(75) Inventors: Akihiro Hino, Fukuoka-ken (JP); Kentaro Motomura, Tokyo (JP)

(73) Assignee: Sony Computer Entertainment Inc. (JP)

(*) Notice: Subject to any disclaimer, the term of this patent is extended or adjusted under 35 U.S.C. 154(b) by 541 days.

(21) Appl. No.: 09/784,923

(22) Filed: Feb. 16, 2001

(65) Prior Publication Data

US 2001/0024201 A1 Sep. 27, 2001

(30) Foreign Application Priority Data

Feb. 17, 2000 (JP) ........................ 2000-039820
Jan. 24, 2001 (JP) ........................ 2001-015757

(51) Int. Cl.[7] ................................ G06T 1/00
(52) U.S. Cl. ................ 345/418; 345/420; 345/426; 345/964; 700/98; 700/182
(58) Field of Search ................ 345/420, 426, 345/964, 418; 700/98, 182

(56) References Cited

FOREIGN PATENT DOCUMENTS

| JP | 07029034 A | 1/1995 |
|----|-----------|--------|
| JP | 08329276 A | 12/1996 |
| JP | 11025286 A | 1/1999 |
| JP | 11175752 A | 7/1999 |
| JP | 11272882 A | 10/1999 |
| JP | 11272883 A | 10/1999 |

OTHER PUBLICATIONS

Artifice, Inc., DesignWorkshop User Guide, 1998, Chapter 3.*
Apple Computer, Inc., 3D Graphics Programming with QuickDraw 3D, 1995, Addison–Wesley, Chapter 8.*
Hudson, S.E., "Adding Shadows to a 3D Cursor", ACM Transactions on Graphics, Association for Computing Machinery, vol. 11, No. 2, Apr. 1, 1992, pp. 193–199.
Foley, J.D. et al., "Computer Graphics", Computer Graphics, Principles and Practice, Oct. 23, 1990, pp. 745–753.
Bergeron, P., "A General Version of Crow's Shadow Volumes", IEEE Computer Graphics and Applications, vol. 6, No. 9, Sep. 1, 1986, pp. 17–28.
Jansen, F.W. et al., "A Shadow Algorithm for CSG", Computers and Graphics, vol. 15, No. 2, 1991, pp. 237–247.

* cited by examiner

Primary Examiner—Mark Zimmerman
Assistant Examiner—Lance W. Sealey
(74) Attorney, Agent, or Firm—Lerner, David, Littenberg, Krumholz & Mentlik, LLP

(57) ABSTRACT

A primary polygon is processed to generate new secondary polygons utilizing a light source as a base point. A front-side secondary polygon is selected from the secondary polygons and drawn in a blackish color by rendering and hidden surface removal utilizing Z-buffering. Then, back-side secondary polygons are drawn by rendering and hidden surface removal utilizing Z-buffering such that the blackish color in portions of the front-side secondary polygon is eliminated, making these portions transparent.

19 Claims, 8 Drawing Sheets

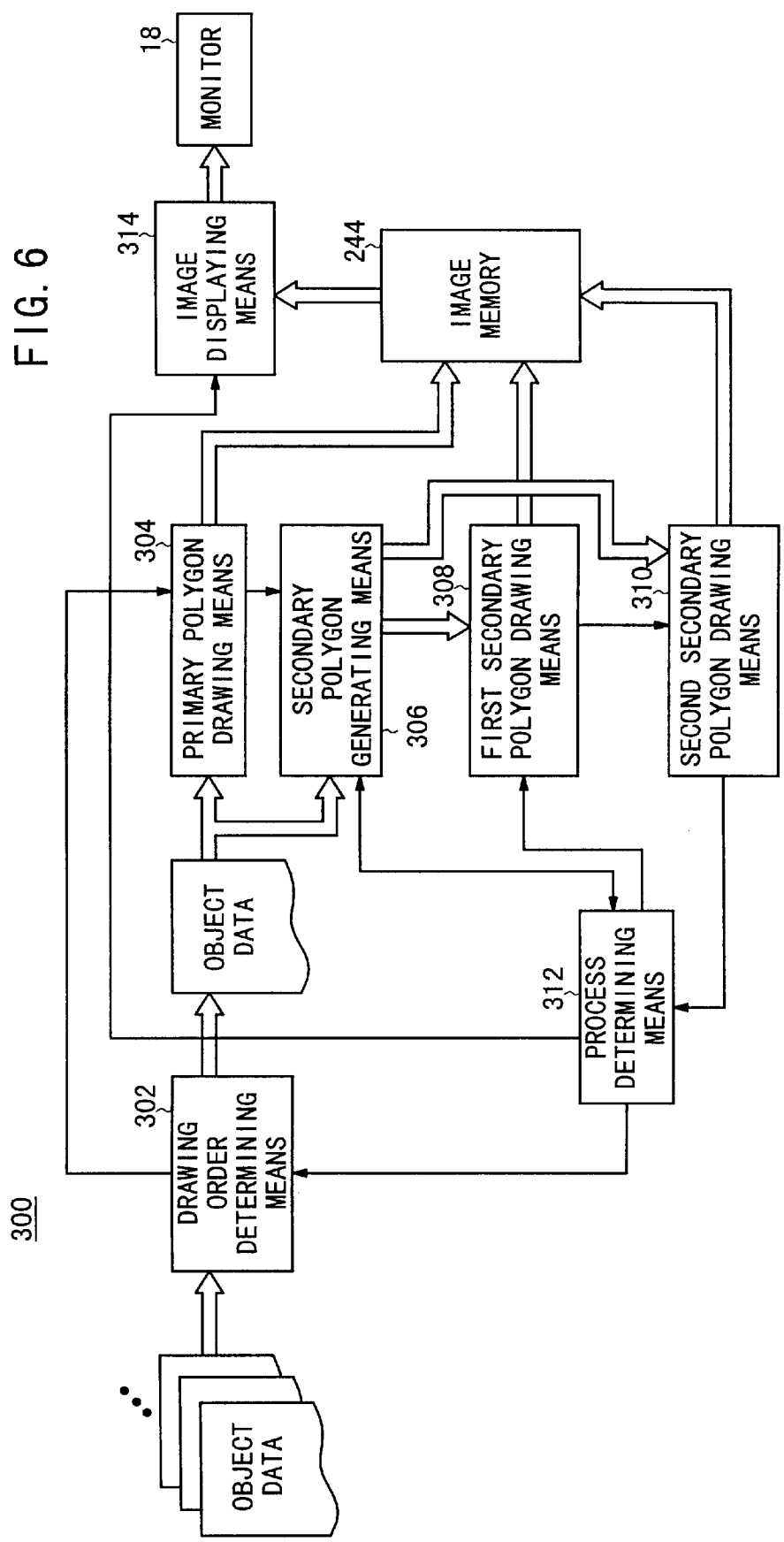

IMAGE DRAWING METHOD, IMAGE DRAWING APPARATUS, RECORDING MEDIUM, AND PROGRAM

BACKGROUND OF THE INVENTION

The present invention relates to an image drawing method, and an image drawing apparatus which make it possible to draw images of shadows produced by light emission from a light source based on a positional relationship of a plurality of objects generated by three-dimensional modeling such that shadow images of objects positioned near the light source are drawn on other objects positioned distantly from the light source. Further, the present invention relates to a recording medium which stores a program for carrying out such image processing, and the program itself.

In recent years, there has been a rapid advancement of computer graphics techniques, such as hidden line removal, hidden surface removal, smooth shading, and texture mapping thanks to the dramatic development of hardware.

Generally, with computer graphics techniques, images are generated by the following procedure. Firstly, a plurality of three-dimensional objects are generated by three-dimensional modeling. Then, rendering is performed by adding optical properties such as specular reflection, diffuse reflection, refraction, and transparency to the objects using shading techniques, by adding surface patterns to the objects, and by plotting images depending on surroundings, such as a window and scenery reflections and ambient light.

It is difficult to perform a process of expressing a shadow of an object cast on another object positioned therebehind based on the layout of a light source and a plurality of objects. One rendering technique for performing the process is ray tracing. However, such a technique requires highly complicated calculations which put CPUS or the like under heavy load. Another rendering technique for expressing a shadow utilizes a stencil buffer. However, the technique requires a stencil buffer as an additional mask (memory). Further, the technique requires a process of extracting an area corresponding to a shadow from the stencil buffer and a process of drawing semi-transparent polygons in a blackish color in the extracted area. As a result, this technique requires a large number of processes.

If heavy load and complicated processes are to be avoided, such as for real time rendering, then it has heretofore been customary to approximate such a shadow with perspective projection onto a simple plane in a simple figure such as a circle.

SUMMARY OF THE INVENTION

The present invention has been made taking the above problem into account, and an object of which is to provide an image drawing method and an image drawing apparatus which make it possible to draw shadow images of a plurality objects in a complicated positional relationship, and draw a shadow image of a complicated object without any difficulties. Another object of the present invention is to provide a recording medium which stores a program for carrying out such image processing without any difficulties, and to provide the program itself.

According to the present invention, a method of drawing a shadow image of a three-dimensional object includes defining at least one primary surface of the three-dimensional object;

generating new secondary surfaces based on the primary surface utilizing a light source as a base point;

drawing a first image of a front-side secondary surface selected from the secondary surfaces; and drawing a second image of a back-side secondary surface selected from the secondary surfaces, the second image being drawn so as to eliminate a portion of the first image, whereby a remaining portion of the first image constitutes the shadow image of the primary surface.

Further, according to the present invention, an apparatus for drawing a shadow image of a three-dimensional object includes means for defining at least one primary surface of the three-dimensional object;

means for generating new secondary surfaces based on the primary surface utilizing a light source as a base point;

first means for drawing a first image of a front-side secondary surface selected from the secondary surfaces; and second means for drawing a second image of a backside secondary surface selected from the secondary surfaces, the secondary image being drawn so as to eliminate a portion of the first image, whereby a remaining portion of the first image constitutes the shadow image of the primary surface.

Further, according to the present invention, a recording medium is recorded with a program and data for drawing image data in an image memory and outputting the image data from the image memory to a monitor. The program includes defining at least one primary surface of the three-dimension object;

generating new secondary surfaces based on the primary surface utilizing a light source as a base point;

drawing a first image of a front-side secondary surface selected from the secondary surfaces; and drawing a second image of a back-side secondary surface selected from the secondary surfaces, the second image being drawn so as to eliminate a portion of the first image, whereby a remaining portion of the first image constitutes the shadow image of the primary surface.

Further, according to the present invention, a program is readable and executable by a computer for operating an image drawing apparatus for drawing image data in an image memory and outputting the image data from the image memory to a monitor, the program including defining at least one primary surface of the three-dimension object;

generating new secondary surfaces based on the primary surface utilizing a light source as a base point;

drawing a first image of a front-side secondary surface selected from the secondary surfaces; and drawing a second image of a back-side secondary surface selected from the secondary surfaces, the second image being drawn so as to eliminate a portion of the first image, whereby a remaining portion of the first image constitutes the shadow image of the primary surface.

Accordingly, it is possible to easily generate shadow images of a plurality of objects in a complicated positional relationship, or generate a shadow image of an object having a complicated shape, without using a stencil buffer. Since the shadow image is generated when the second image is drawn so as to partially eliminate the first image, it is no longer necessary to draw semi-transparent polygons in a blackish color in the last step. Therefore, the number of processes can be effectively decreased. In particular, according to the present invention, three-dimensional information concerning an object on which a shadow is projected is not necessary in drawing a shadow image. That is, all that is needed is information concerning two-dimensional images in an image memory and Z-buffer values for respective pixels of the two-dimensional images.

According to the present invention, the primary surface may be drawn by rendering and hidden surface removal. Further, the first and second images of the secondary surfaces may be drawn by rendering and hidden surface removal. Preferably, Z-buffering is used in performing hidden surface removal.

Further, according to the present invention, a series of drawing processes, including drawing the primary surface, generating the secondary surfaces, and drawing the first and second images of the secondary surfaces, are performed for each of the primary surfaces constituting the three-dimensional object, thereby drawing both an image of the three-dimensional object and a shadow image of the three-dimensional object.

Further, according to the present invention, when there are a plurality of primary surfaces constituting at least one three-dimensional object, the series of drawing processes are performed for each of the primary surfaces in an order beginning with the primary surface farthest from the light source and ending with the primary surface closest the light source such that a shadow image of a primary surface is drawn on another primary surface.

Further, according to the present invention, when there are a plurality of three-dimensional objects, the series of drawing processes are performed for each of the three-dimensional objects in an order beginning with the three-dimensional object farthest from the light source and ending with the three-dimensional object closet to the light source such that a shadow image of at least one three-dimensional object is drawn on another three-dimensional object.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a functional block diagram of the image drawing means according to the present invention;

DESCRIPTION OF THE PREFERRED EMBODIMENT

An embodiment of an image drawing method, an image drawing apparatus, a recording medium, and a program according to the present invention as applied to an entertainment system for executing various programs (hereinafter simply referred to as the entertainment system according to the present invention) will be described with reference to the drawings.

Figure 1:
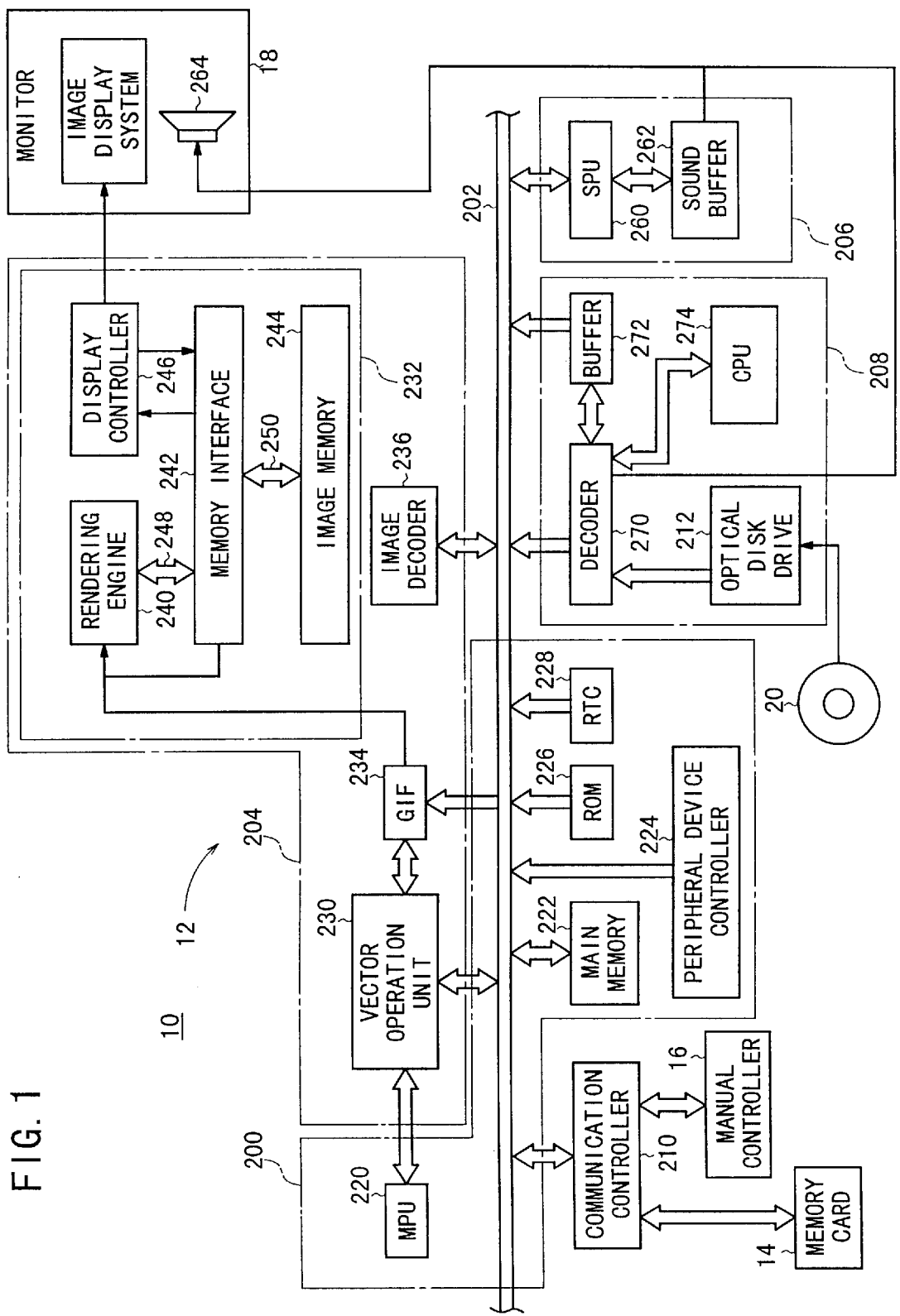
FIG. 1 is a view showing an arrangement of an entertainment system according to the present invention.

As shown in FIG. 1, the entertainment system 10 according to the present invention basically comprises an entertainment apparatus 12 for executing various programs, a memory card 14 detachably connected to the entertainment apparatus 12, a manual controller 16 detachably connected to the entertainment apparatus 12, and a monitor (display) 18, such as a television receiver, which is supplied with video and audio signals from the entertainment apparatus 12.

The entertainment apparatus 12 reads a program recorded in a mass storage medium, such as an optical disk 20 such as a CD-ROM or the like, and executes a game, for example, based on the program depending on commands supplied from a user, e.g., a game player, via the manual controller 16. The execution of the game mainly represents controlling the progress of the game by controlling the display of images and the generation of sounds on the monitor 18 based on manual input actions entered from the manual controller 16.

As shown in FIG. 1, the entertainment apparatus 12 generally comprises a control system 200, a graphic generating system 204 connected to the control system 200 via a system bus 202, a sound generating system 206 connected to the control system 200 via the system bus 202, and an optical disk control system 208 connected to the control system 200 via the system bus 202. A communication controller 210 for controlling data to be inputted to and outputted from the manual controller 16 and the memory card 14 is also connected to the control system 200 via the system bus 202.

The manual controller 16 supplies commands (including manipulation data) from the user via the communication controller 210 to the entertainment apparatus 12. The optical disk control system 208 includes an optical disk drive 212 in which the optical disk 20 is loaded. The optical disk 20 may comprise a CD-ROM or the like as a specific example of a recording medium according to the present invention.

The control system 200 controls motions of characters displayed on the monitor 18 based on a program and data read from the optical disk 20 and commands supplied from the manual controller 16.

The control system 200 includes a micro processing unit (MPU) 220, a main memory 222, a peripheral device controller 224, a ROM 226, and a real-time clock (RTC) 228. The MPU 220 controls the entertainment system 12. The main memory 222 stores various programs to be executed and various data. That is, the main memory 222 at least stores a game program so that the game program can be executed on the main memory 222. The peripheral device controller 224 controls interrupts and direct memory access (DMA) data transfer. The ROM 226 stores various programs such as an operating system for managing the graphic system 204, the sound generating system 206, etc. Further, the ROM 226 stores information for controlling kernel or the like, and information for performing an OSD function.

The MPU 220 controls the entertainment apparatus 12 in its entirety by executing the operating system stored in the ROM 226. The MPU 220 may comprise a 32-bit RISC-CPU, for example.

When the entertainment apparatus 12 is turned on, the MPU 220 executes the operating system stored in the ROM 226 to start controlling the graphic generating system 204, the sound generating system 206, etc.

When the operating system is executed, the MPU 220 initializes the entertainment apparatus 12 in its entirety for checking its operation, and thereafter controls the optical disc control system 208 to execute an application program, such as a game program recorded in the optical disk 20.

As the application program, such as a game program, is executed, the MPU 220 controls the graphic generating system 204, the sound generating system 206, etc. depending on commands entered from the user for thereby controlling the display of images and the generation of music sounds and sound effects.

The graphic generating system 204 comprises a vector operation unit 230 for performing floating-point vector operations required for geometry processing, an image processor 232 for generating image data under the control of the MPU 220 and outputting the generated image data to a monitor 18, e.g., a CRT, a graphic interface (GIF) 234 for serving as transfer paths between the MPU 220, the vector operation unit 230, and the image processor 232, and an image decoder 236 for decoding image data compressed and encoded by an orthogonal transform, such as a discrete cosine transform.

The image processor 232 comprises a rendering engine 240, a memory interface 242, an image memory 244, and a display controller 246, such as a programmable CRT controller or the like.

The rendering engine 240 serves to render and store image data in the image memory 244 via the memory interface 242 based on a rendering command supplied from the MPU 220.

A first bus 248 is connected between the memory interface 242 and the rendering engine 240, and a second bus 250 is connected between the memory interface 242 and the image memory 244. Each of the first and second buses 248, 250 has a 128-bit width, for example, for allowing the rendering engine 240 to render and store image data in the image memory 244 at a high speed.

The rendering engine 240 is capable of rendering image data of 320×240 pixels or image data of 640×480 pixels according to the NTSC or PAL system on a real-time fashion, i.e., more than ten times to several ten times in 1/60 seconds to 1/30 seconds.

Figure 2:
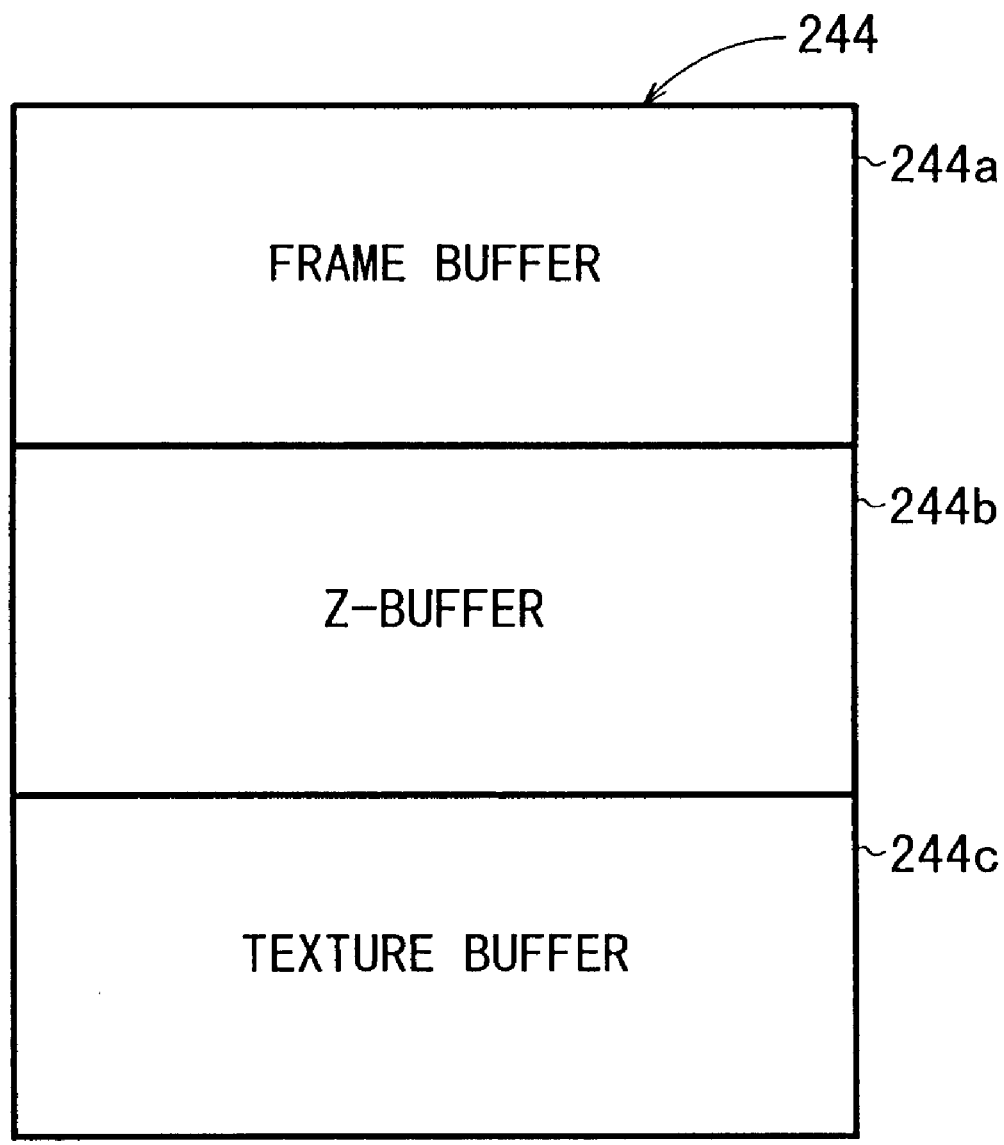
FIG. 2 is a view showing an example of addressing an image memory.

The image memory 244 is a unified memory structure that is able to designate a texture rendering area and a display rendering area as the same area. For example, in FIG. 2, a frame buffer 244a, a Z-buffer 244b, and a texture buffer 244c are designated by logical addressing in the image memory 244, respectively. Alternatively, the Z-buffer may be separately designated in another memory by physical addressing.

As shown in FIG. 1, the display controller 246 writes texture data read from the optical disk 20 via the optical disk drive 212 or texture data generated in the main memory 222 via the memory interface 242 into the texture buffer 244c of the image memory 244, and reads image data stored in the frame buffer 244a of the image memory 244 via the memory interface 242 and outputs the read image data to the monitor 18 to display an image on its display screen.

The sound generating system 206 comprises a sound processing unit (SPU) 260 for generating music sounds, sound effects, etc. based on instructions from the MPU 220, and a sound buffer 262 for storing music sounds, sound effects, etc. generated by the SPU 260. Audio signals representing music sounds, sound effects, etc. generated by the SPU 260 are supplied to audio terminals of the monitor 18. The monitor 18 has a speaker 264 which radiates music sounds, sound effects, etc. generated by the SPU 260 based on the supplied audio signals.

The SPU 260 has an ADPCM (adaptive differential PCM) function for reproducing 16-bit sound data which has been encoded as 4-bit differential sound data by ADPCM, a reproducing function for reproducing waveform data stored in the sound buffer 262 to generate sound effects, etc., and a modulating function for modulating and reproducing the waveform data stored in the sound buffer 262.

The sound system 206 with these functions can be used as a sampling sound source which generates music sounds, sound effects, etc. based on the waveform data stored in the sound buffer 262 according to instructions from the MPU 220.

The optical disk control system 208 comprises an optical disk drive 212 for reproducing application programs and data recorded on the optical disk 20, a decoder 270 for decoding programs and data that are recorded with an error correcting code added thereto, and a buffer 272 for temporarily storing data read from the optical disk drive 212 so as to allow the data from the optical disk 20 to be read at a high speed. A CPU 274 is connected to the decoder 270.

Sound data recorded on the optical disk 20 which is read by the optical disk drive 212 includes PCM data converted from analog sound signals, in addition to the ADPCM data.

The ADPCM data, which is recorded as 4-bit differential data of 16-bit digital data, is decoded by the decoder 270, supplied to the SPU 260, converted thereby into analog data, and applied to drive the speaker 264.

The PCM data, which is recorded as 16-bit digital data, is decoded by the decoder 270 and then applied to drive the speaker 264.

Next, a characteristic function of the entertainment system 10 according to an embodiment of the present invention will be described with reference to FIGS. 3 through 8.

Figure 3:
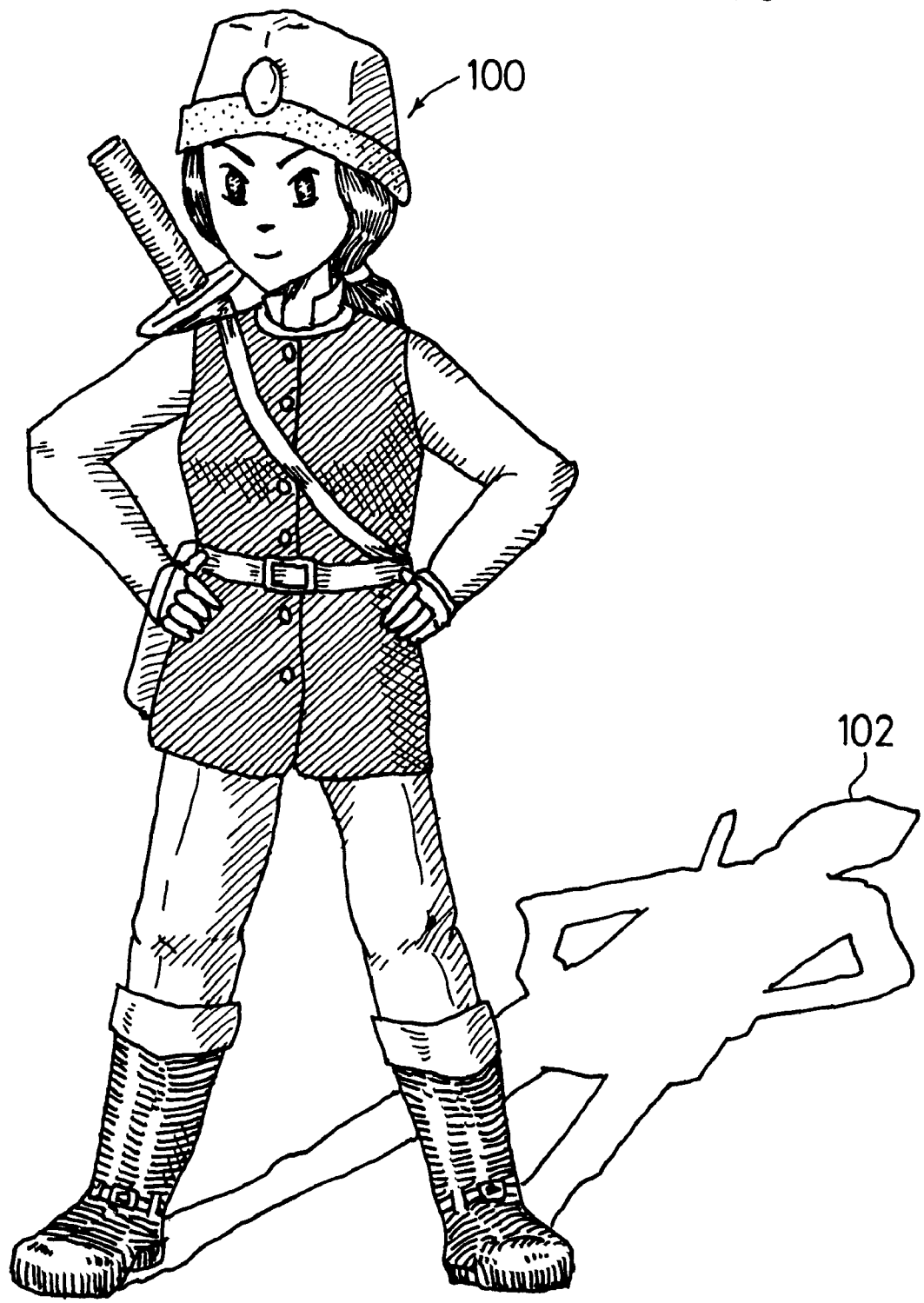
FIG. 3 is a view showing an image of a main character and a shadow image of the main character.

In FIG. 3, for example, an object as a main character 100 in a role playing game is generated by a three-dimensional modeling technique. The characteristic function of the entertainment system 10 is to draw a shadow image 102 of the main character 100 on the background or other objects based on a positional relationship between the main character 100 and a light source.

Various objects, such as the main character 100, are used in the role playing game. Each of the objects is made up of a plurality of polygons (primary polygons). The characteristic function of the entertainment system 10 is performed by rendering the plurality of primary polygons one by one for drawing the shadow image 102 on the background or other objects.

The processing sequence of drawing a shadow image of a primary polygon selected from the plurality of primary polygons is described below.

Firstly, the selected primary polygon is drawn by rendering and hidden surface removal utilizing Z-buffering (depth buffering). Next, new secondary polygons corresponding to the primary polygon are generated utilizing a light source as a base point. Thereafter, visible secondary polygons, i.e., the surfaces which are visible from a viewing position (camera position) in the world coordinate system (hereinafter also referred to as the front-side secondary polygons) are subjected to rendering and hidden surface removal utilizing Z-buffering. Then, invisible secondary polygons, i.e., the surfaces which are not visible from the viewing position (hereinafter also referred to as the back-side secondary polygons) are subjected to rendering and hidden surface removal utilizing Z-buffering. It is to be understood that various light sources such as a point light source and a surface light source can be used as the light source.

The above-described processing sequence will be described more specifically with reference to FIGS. 4A through 4D.

Figure 4A:
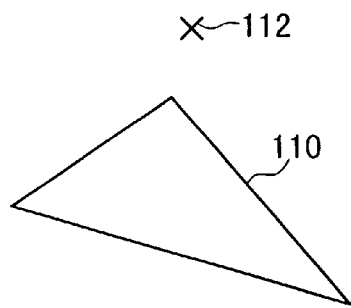
FIGS. 4A through 4D are views for explaining an example of generating a shadow image by image drawing techniques according to the present invention.

As shown in FIG. 4A, it is assumed that a triangular primary polygon 110 is positioned above a surface (for example, a ground surface as a background). Firstly, the primary polygon 110 generated by rendering and hidden surface removal utilizing Z-buffering is drawn in the image memory 244.

Figure 4B:
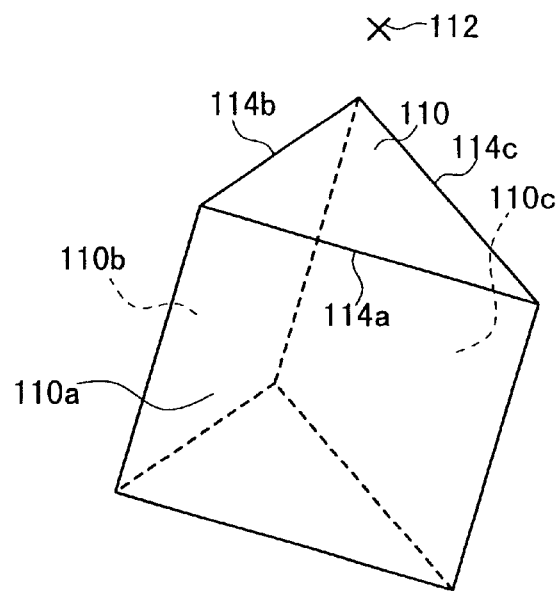

Next, as shown in FIG. 4B, new secondary polygons 110a through 110c corresponding to the primary polygon 110 are generated utilizing a light source 112 as a base point. Specifically, three segments (lines) 114a through 114c constituting the primary polygon 110 are subjected to a perspective transformation to the ground surface. Then, the three secondary polygons 110a through 110c are generated based on coordinate values corresponding to vertices of the primary polygon 110 (vertices of the three segments 114a through 114c) and coordinate values corresponding to vertices of the transformed primary polygon projected on the ground surface.

Figure 4C:
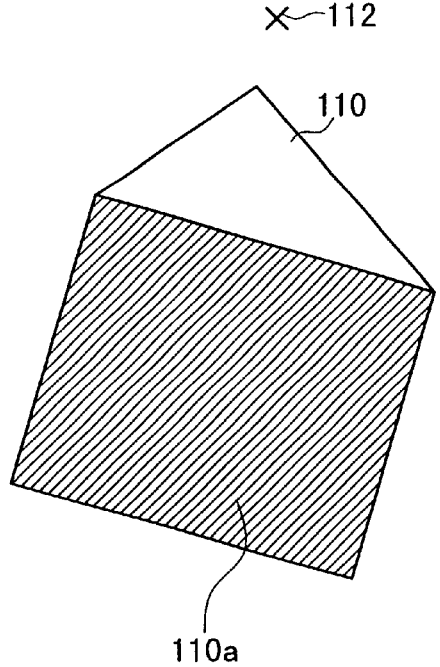
Figure 4D:
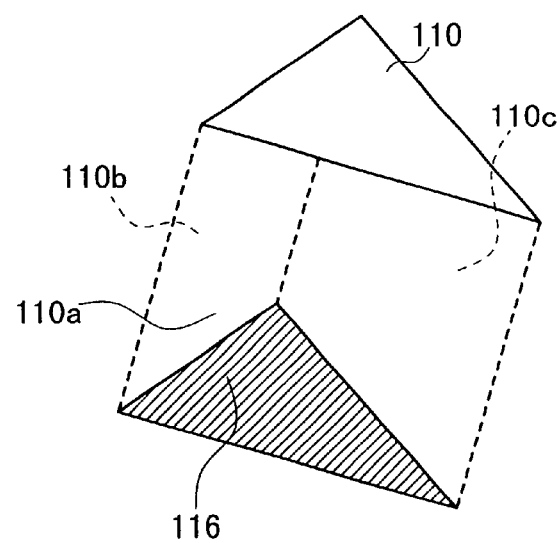

Thereafter, as shown in FIG. 4C, the front-side secondary polygon 110a is subjected to rendering and hidden surface removal utilizing Z-buffering for drawing an image of the secondary polygon 110a. At this time, the image of the secondary polygon 110a is drawn in a blackish color.

Then, the back-side secondary polygons 110b, 110c are subjected to rendering and hidden surface removal utilizing Z-buffering for drawing images of the secondary polygons 110b, 110c. At this time, the images of the secondary polygons 110b, 110c are drawn such that the color (blackish color) of the front-side secondary polygon 110a is eliminated. That is, the eliminated portions of the front-side secondary polygon 110a become transparent.

By the above drawing processing sequence, a shadow image 116 of the primary polygon 110 is generated on the ground surface.

Next, the processing sequence of drawing a shadow image of the primary polygon 110 on another object (polygon, moving image, or still image) will be described with reference to FIGS. 5A through 5D.

Figure 5A:
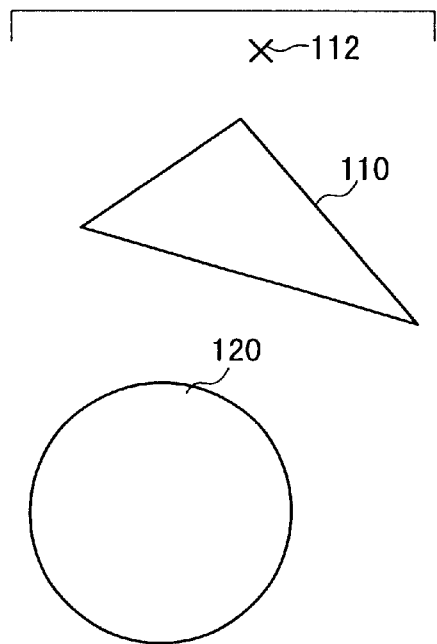
FIGS. 5A through 5D are views for explaining another example of generating a shadow image by the image drawing techniques according to the present invention.

In this example, as shown in FIG. 5A, it is assumed that there is a spherical object 120 in addition to the primary polygon 110. Further, it is assumed that the spherical object 120 is remotely positioned from the light source 112 in comparison with the primary polygon 110. That is, it is assumed that the shadow image of the polygon 110 is to be drawn on the surface of the spherical object 120.

Figure 5B:
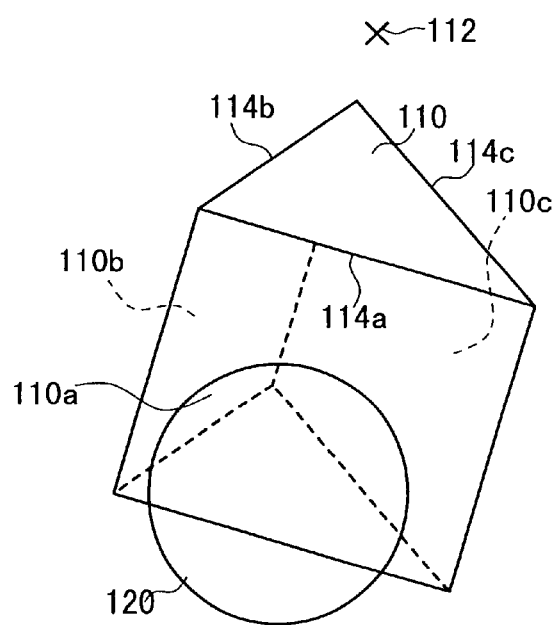

Images of the primary object 110 and the spherical object 120 are drawn in the image memory 244 in an order beginning with the object most distant from the light source 112 and ending with the object closest to the light source 112. That is, the spherical object 120 is drawn first. Thereafter, the primary polygon 110 is drawn in the image memory 244 after being subjected to rendering and hidden surface removal utilizing Z-buffering. Then, as shown in FIG. 5B, new secondary polygons 110a through 110c corresponding to the primary polygon 110 are generated utilizing the light source 112 as a base point.

Figure 5C:
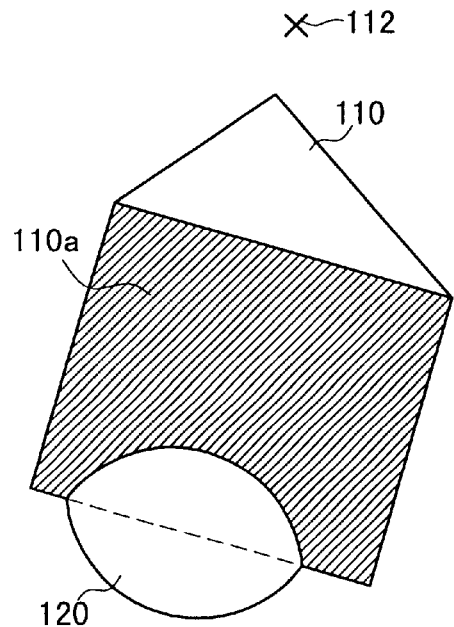

Next, as shown in FIG. 5C, the front-side secondary polygon 110a is subjected to rendering and hidden surface removal utilizing Z-buffering for drawing an image of the secondary polygon 110a in a blackish color. At this time, Z-buffer values for respective pixels of the spherical body 120 and the Z-buffer values for respective pixels of the front-side secondary polygon 110a are compared with each other at portions where pixels of the spherical body 120 and pixels of the front-side secondary polygon 110a are overlapping with each other. If a Z-buffer value for a pixel of the front-side secondary polygon 110a is, for example, higher than a Z-buffer value for the corresponding (overlapping) pixel of the spherical body 120, the pixel of the front-side secondary polygon 110a is not drawn. That is, portions of the front-side secondary polygon 110a hidden by the spherical body 120 (pixels where the front-side secondary polygon 110a has the higher Z-buffer values) are not drawn. With the above process, as shown in FIG. 5C, an image showing the spherical body 120 partially cut away by the front-side secondary polygon 110a is generated.

Then, the back-side secondary polygons 110b, 110c are subjected to rendering and hidden surface removal utilizing Z-buffering for drawing images of the secondary polygons 110b, 110c such that the color (blackish color) of the front-side secondary polygon 110a is eliminated. At this time, as with the front secondary polygon 110a, the back-side secondary polygons 110b, 110c are drawn based on comparison between the Z-buffer values of the back-side secondary polygons 110b, 110c and the Z-buffer values of the spherical body 120. That is, portions of the back-side secondary polygons 110b, 110c hidden by the spherical body 120 are not drawn.

Figure 5D:
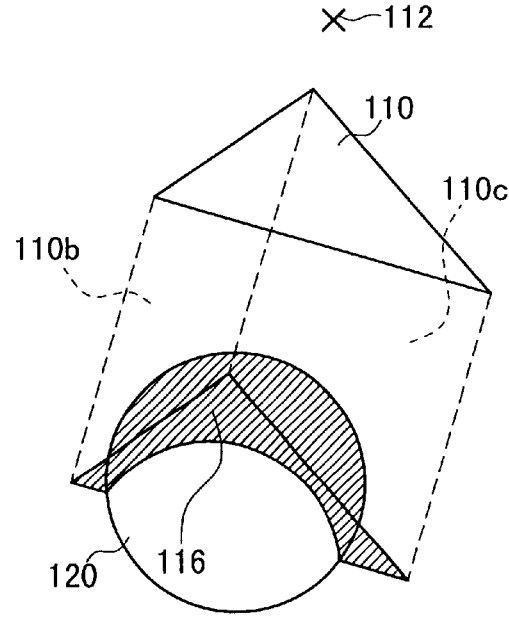

As shown in FIG. 5D, the blackish color of the front-side secondary polygon 110a is not eliminated by the back-side secondary polygons 110b, 110c at some portions where the back-side secondary polygons 110b, 110c are not drawn based on the comparison between the Z-buffer values of the back-side secondary polygon 110b, 110c and the Z-buffer values of the spherical body 120. That is, a shadow image of the primary polygon 110 projected on the surface (spherical surface) of the spherical body 120 is generated by the remaining portion of the front-side secondary polygon 110a drawn in the blackish color.

Next, an example of software (image drawing program 300) for carrying out the above-described characteristic function will be described with reference to FIGS. 6 through 8.

The image drawing program 300 can be supplied from a randomly accessible recording medium, such as an optical disk 20, a memory card 14 or the like, to the entertainment apparatus 12. Alternatively, the image drawing program 300 can be downloaded via a network such as the Internet or downloaded via a satellite communication or the like to the entertainment apparatus 12. In the following explanation, it is assumed that the image drawing program 300 is supplied from an optical disk 20.

Specifically, the optical disk 20 is played back by the optical disk drive 212 to read the image drawing program 300, and the read image drawing program 300 is stored in the main memory 222 in the control system 200 of the entertainment apparatus 12 by a predetermined process. Thereafter, the image drawing program 300 is executed by the MPU 220 of the control system 200 of the entertainment apparatus 12.

As shown in FIG. 6, the image drawing program 300 comprises drawing order determining means 302, primary polygon drawing means 304, secondary polygon generating means 306, first secondary polygon drawing means 308, second secondary polygon drawing means 310, process determining means 312, and image displaying means 314. The drawing order determining means 302 determines the order of drawing objects based on the distance from a light source 112, with the farthest object from the light source being drawn first and the closest object to the light source being drawn last. The primary polygon drawing means 304 draws a primary polygon (an element of an object) 110 according to the determined drawing order by rendering and hidden surface removal. The secondary polygon generating means 306 generates secondary polygons 110a through 110c corresponding to the primary polygon 110 utilizing the light source 112 as a base point. The first secondary polygon drawing means 308 draws a front-side secondary polygon 110a selected from the secondary polygons 110a through 110c by rendering and hidden surface removal. The second secondary polygon drawing means 310 draws back-side secondary polygons 110b, 110c selected from the secondary polygons 110a through 110c by rendering and hidden surface removal. The process determining means 312 determines whether or not each of the drawing processes has been finished or not. The image displaying means 314 outputs image data drawn in the image memory 244 to the monitor 18 so that the outputted image data can be displayed on the screen of the monitor 18.

Next, the processing sequence of the image drawing program 300 will be described with reference to flow charts shown in FIGS. 7 and 8.

It is assumed that positions of objects to be drawn by the image drawing program 300 are defined by the world coordinate system.

Figure 7:
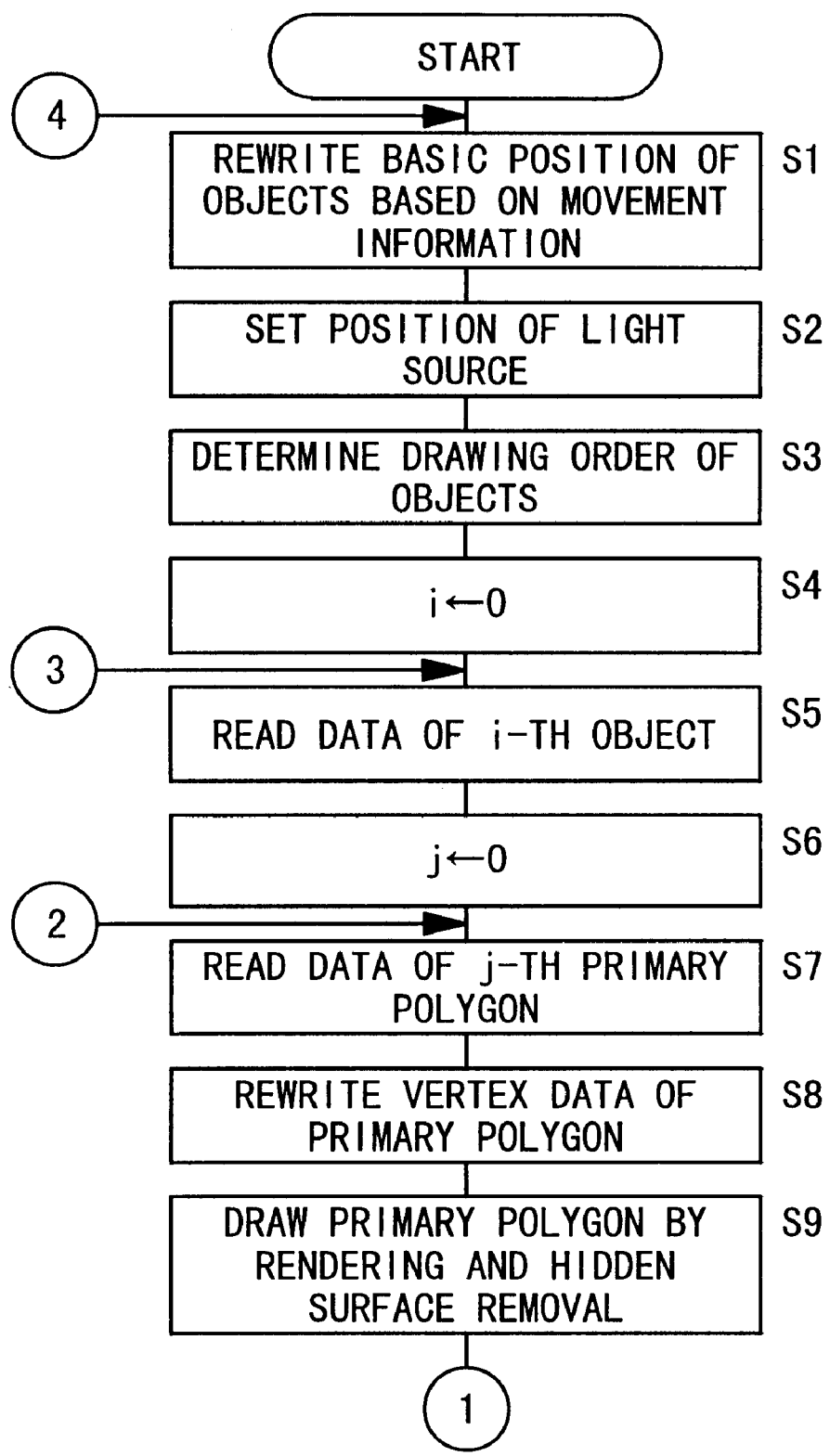
FIG. 7 is a flow chart showing a processing sequence (No. 1) of the image drawing means according to the present invention.

In Step S1 of FIG. 7, when the image drawing program 300 receives movement information indicating movements of objects, the image drawing program 300 rewrites the basic positions (coordinates in the world coordinate system) of the moved objects.

Next, in Step S2, the image drawing program 300 sets a position of a light source 112. Then, in Step S3, the drawing order determining means 302 of the image drawing program 300 determines an order of drawing objects. Specifically, the drawing order determining means 302 determines the order based on the basic positions of the objects and the position of the light source 112 such that data of the objects are read in order of decreasing distance from the light source 112. That is, the objects are drawn in order of decreasing distance from the light source 112.

Then, in Step S4, the image drawing program 300 stores an initial value "0" in an index register i used to retrieve an object, thereby initializing the index register i.

Then, in Step S5, the image drawing program 300 reads data concerning the i-th object. Thereafter, in Step S6, the image drawing program 300 stores an initial value "0" in an index register j used to retrieve a primary polygon, thereby initializing the index register j.

Then, in Step S7, the primary polygon drawing means 304 reads data concerning the j-th primary polygon 110 from the i-th object data read in Step S5.

Then, in Step S8, the primary polygon drawing means 304 rewrites data concerning vertices of the j-th primary polygon 110 based on the basic position of the i-th object and optical information (the position of the light source 112, the type of the light source 112, or the like). Then, in Step S9, the primary polygon drawing means 304 draws an image of the j-th primary polygon 110 in the image memory 244 by rendering and hidden surface removal utilizing Z-buffering.

Figure 8:
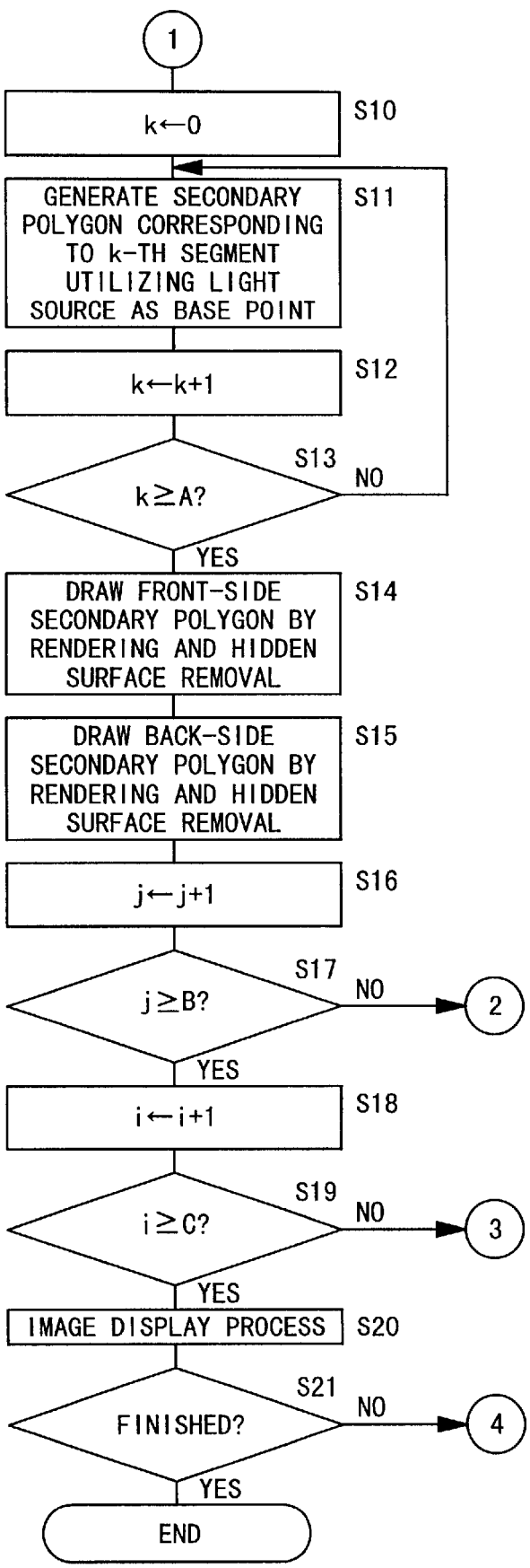
FIG. 8 is a flow chart showing another processing sequence (No. 2) of the image drawing means according to the present invention.

Then, in Step S10 of FIG. 8, the secondary polygon generating means 306 stores an initial value "0" in an index register k used to retrieve a segment, thereby initializing the index register k.

Then, in Step S11, the secondary polygon generating means 306 reads the k-th segment constituting the primary polygon 110 from the index register k for generating the k-th secondary polygon. Specifically, the secondary polygon generating program 300 performs a perspective transformation of the k-th segment to the ground surface utilizing the light source 112 as a base point. The k-th secondary polygon is generated based on the position of the k-th segment and the position of the transformed k-th segment, i.e., coordinates corresponding to vertices of the k-th segment and coordinates corresponding vertices to of the k-th segment projected on the ground surface.

In Step S12, the secondary polygon generating means 306 updates the value of the index register k to be incremented by 1. Then, in Step S13, the process determining means 312 determines whether secondary polygons for all of the segments constituting the primary polygon 110 have been generated or not. That is, it is determined whether the value of the index register k is equal to or more than the number A of the segments constituting the primary polygon 110 or not.

If the value of the index register k is equal to or more than the number A of the segments constituting the primary polygon 110, the process determining means 312 determines that secondary polygons for all of the segments constituting the primary polygon 110 have been generated.

If the process determining means 312 determines that secondary polygons for all of the segments constituting the primary polygon 110 have not been generated, control passes back to Step S11 for generating another secondary polygon for the next segment. When secondary polygons for all of the segments constituting the primary polygon 110 have been generated, control passes to Step S14. In Step S14, the first secondary polygon drawing means 308 draws an image of a front-side secondary polygon 110a in a blackish color in the image memory 244 by rendering and hidden surface removal utilizing Z-buffering.

Then, in Step S15, the second secondary polygon drawing means 310 draws images of the remaining back-side secondary polygons 110b, 110c in the image memory 244 by rendering and hidden surface removal utilizing Z-buffering. The images of the back-side secondary polygons 110b, 110c are drawn such that the color (blackish color) of the front-side secondary polygon 110a is eliminated.

In Step S16, the value of the index register j is incremented by 1. Then, in Step S17, the process determining means 312 determines whether all the primary polygons 110 constituting the i-th object have been drawn or not. That is, it is determined whether the value of the index register j is equal to or more than the number B of the polygons constituting the i-th object or not. If the value of the index register j is equal to or more than the number B of the polygons constituting the i-th object, the process determining means 312 determines that all the primary polygons constituting the i-th object have been drawn.

If the process determining means 312 determines that all the primary polygons 110 constituting the object have not been drawn, control passes back to Step S7 for drawing another primary polygon 100, and generating and drawing secondary polygons 110a through 110c.

When all the primary polygons 110 constituting the object have been drawn, control passes to Step S18. In Step S18, the value of the index register i is incremented by 1. Then, in Step S19, the process determining means 312 determines whether or not all the objects have been drawn. That is, it is determined whether or not the value of the index register i is equal to or more than the number C of the objects. If the value of the index register i is equal to or more than the number C of the objects, the process determining means 312 determines that all the objects have been drawn.

If the process determining means 312 determines that all the objects have not been drawn, control passes back to Step S5 for performing the process of another object, i.e., drawing primary polygons 110, and generating and drawing secondary polygons 110a through 110c.

When all the objects have been drawn, control passes to Step S20. In Step S20, the image displaying means 314 outputs image data drawn in the image memory 244 to the monitor 18 so that the outputted image data can be displayed on the screen of the monitor 18.

Then, in Step S21, the process determining means 312 determines whether or not there is a program ending request (game over, power off, etc.) to the image drawing program 300. If there is not a program ending request, control passes back to Step S1 for repeating the subsequent steps.

As described above, according to the entertainment system 10 of the present invention, the new secondary polygons 110a through 110c corresponding to each of at least one primary polygon 110 constituting a three dimensional object are generated utilizing the light source 112 as a base point. Then, the front-side secondary polygon 110a selected from the secondary polygons 110a through 110c is drawn. Then, the remaining back-side secondary polygons 110b, 110c are drawn such that the color of the front-side secondary polygon 110a is eliminated. Accordingly, it is possible to easily generate shadow images of a plurality of objects in a complicated positional relationship, or generate a shadow image of an object having a complicated shape without using a stencil buffer or the like.

Since a shadow image is generated when the back-side secondary polygons 110b, 110c for partially eliminating the front-side secondary polygon 110a is drawn, it is no more necessary to draw semi-transparent polygons in a blackish color in the last step. Therefore, the number of processes can be effectively decreased.

In particular, according to the present embodiment, three-dimensional information concerning an object on which a shadow is projected (the spherical body in the example shown in FIG. 5A) is not necessary in drawing a shadow image. That is, information concerning two-dimensional images in an image memory and Z-buffer values for respective pixels of the two-dimensional images are only needed.

The image drawing method, the image drawing apparatus, the recording medium, and the program according to the present invention shall not be limited to the particular embodiment disclosed herein. It will be apparent to a person skilled in the art that numerous modifications and variations may be made without departing from the spirit and scope of the invention.

What is claimed is:

1. A method of drawing a shadow image of a three-dimensional object, comprising:
   defining at least one primary surface of said three-dimensional object;
   generating new secondary surfaces based on said primary surface utilizing a light source as a base point;
   drawing a first image of a front-side secondary surface selected from said new secondary surfaces; and
   drawing a second image of a back-side secondary surface selected from said new secondary surfaces, said step of drawing said second image eliminating a portion of said first image, whereby a remaining portion of said first image constitutes a shadow image of said primary surface.

2. An image drawing method according to claim 1, further comprising:
   drawing said primary surface by rendering and hidden surface removal,
   wherein said first and second images of said new secondary surfaces are drawn by rendering and hidden surface removal.

3. An image drawing method according to claim 2, further comprising defining a plurality of primary surfaces constituting said three-dimensional object, and wherein said steps of drawing said primary surface, generating said new secondary surfaces, and drawing said first and second images of said new secondary surfaces are performed in a series of drawing processes for each of said plurality of primary surfaces, whereby an image of said three-dimensional object and said shadow image of said three-dimensional object are drawn.

4. An image drawing method according to claim 3, wherein said series of drawing processes are performed for each of said plurality of primary surfaces in an order beginning with said primary surface farthest from said light source and ending with said primary surface closest to said light source.

5. An image drawing method according to claim 3, wherein there are a plurality of three-dimensional objects, said series of drawing processes being performed for each of said plurality of three-dimensional objects in an order beginning with said three-dimensional object farthest from said light source and ending with said three-dimensional object closest to said light source, such that a shadow image of at least one of said three-dimensional objects is drawn on another one of said three-dimensional objects.

6. An image drawing method according to claim 2, wherein Z-buffering is utilized in performing said hidden surface removal.

7. An apparatus for drawing a shadow image of a three-dimensional object, comprising:
   means for defining at least one primary surface of said three-dimensional object;
   means for generating new secondary surfaces based on said primary surface utilizing a light source as a base point;
   first means for drawing a first image of a front-side secondary surface selected from said new secondary surfaces; and
   second means for drawing a second image of a back-side secondary surface selected from said new secondary surfaces, said second image being drawn so as to eliminate a portion of said first image, whereby a remaining portion of said first image constitutes a shadow image of said primary surface.

8. An image drawing apparatus according to claim 7, further comprising:
   means for drawing said primary surface by rendering and hidden surface removal,
   wherein said first and second means draw said first and second images, respectively, by rendering and hidden surface removal.

9. An image drawing apparatus according to claim 8, wherein said three-dimensional object includes a plurality of primary surfaces, said apparatus further comprising means for carrying out a series of drawing processes performed by said means for defining a primary surface, said means for generating new secondary surfaces, said first means for drawing a first image, and said second means for generating a second image for each of said plurality of primary surfaces, whereby an image of said three-dimensional object and said shadow image of said three-dimensional object are drawn.

10. An image drawing apparatus according to claim 9, further comprising means for determining a drawing order for each of said plurality of primary surfaces such that said series of drawing processes are performed for each of said primary surfaces beginning with said primary surface farthest from said light source and ending with said primary surface closest to said light source.

11. An image drawing apparatus according to claim 9, further comprising means for determining a drawing order for a plurality of three-dimensional objects such that said series of drawing processes are performed for each of said three-dimensional objects beginning with said three-dimensional object farthest from said light source and ending with said three-dimensional object closest to said light source, such that a shadow image of at least one of said three-dimensional objects is drawn on another one of said three-dimensional objects.

12. An image drawing apparatus according to claim 8, wherein Z-buffering is utilized in performing said hidden surface removal.

13. A recording medium recorded with a program and data for drawing image data in an image memory and outputting said image data from said image memory to a monitor, said program comprising:

defining at least one primary surface of three-dimensional object;

generating new secondary surfaces based on said primary surface utilizing a light source as a base point;

drawing a first image of a front-side secondary surface selected from said new secondary surfaces; and drawing a second image of a back-side secondary surface selected from said new secondary surfaces, said step of drawing said second image eliminating a portion of said first image, whereby a remaining portion of said first image constitutes shadow image of said primary surface.

14. A recording medium according to claim 13, wherein said primary surface is defined by drawing said primary surface using rendering and hidden surface removal, and said first and second images of said new secondary surfaces are drawn by rendering and hidden surface removal.

15. A recording medium according to claim 14, said program further comprising defining a plurality of primary surfaces constituting said three-dimensional object, and wherein said steps of drawing said primary surface, generating said new secondary surfaces, and drawing said first and second images of said new secondary surfaces are performed in a series of drawing processes for each of said plurality of primary surfaces, whereby an image of said three-dimensional object and a shadow image of said three-dimensional object are drawn.

16. A recording medium according to claim 15, said program further comprising determining a drawing order for each of said plurality of primary surfaces such that said series of drawing processes are performed for each of said primary surfaces beginning with said primary surface farthest from said light source and ending with said primary surface closest to said light source.

17. A recording medium according to claim 15, said program further comprising determining a drawing order for a plurality of three-dimensional objects such that said series of drawing processes are performed for each of said three-dimensional objects beginning with said three-dimensional object farthest from said light source and ending with said three-dimensional object closest to said light source, such that a shadow image of at least one of said three-dimensional objects is drawn on another one of said three-dimensional objects.

18. A recording medium according to claim 14, wherein Z-buffing is utilized in performing said hidden surface removal.

19. A system for drawing image data in an image memory and outputting said image data from said image memory to a monitor, said system comprising:

a processor operable to execute instructions; and instructions, said instructions including:

defining at least one primary surface of a three-dimensional object;

generating new secondary surfaces based on said primary surface utilizing a light source as a base point;

drawing a first image of a front-side secondary surface selected from said new secondary surfaces; and drawing a second image of a back-side secondary surface selected from said new secondary surfaces, said step of drawing said second image eliminating a portion of said first image, whereby a remaining portion of said first image constitutes shadow image of said primary surface.

* * * * *

UNITED STATES PATENT AND TRADEMARK OFFICE
CERTIFICATE OF CORRECTION

PATENT NO. : 6,717,575 B2
DATED : April 6, 2004
INVENTOR(S) : Akihiro Hino and Kentaro Motomura It is certified that error appears in the above-identified patent and that said Letters Patent is hereby corrected as shown below:

Column 13,
Line 28, insert -- a -- after "of".
Line 39, insert -- a -- after "constitutes --.

Column 14,
Line 45, insert -- a -- after "constitutes --.

Signed and Sealed this

Twenty-ninth Day of June, 2004

JON W. DUDAS
*Acting Director of the United States Patent and Trademark Office*